US012796721B2

(12) United States Patent
Karava et al.

(10) Patent No.: US 12,796,721 B2
(45) Date of Patent: Nov. 17, 2026

(54) STABLE CREATINE BEVERAGES

(71) Applicant: The Coca-Cola Company, Atlanta, GA (US)

(72) Inventors: Nilesh Karava, Marietta, GA (US); Bradley Schambach, Loganville, GA (US)

(73) Assignee: The Coca-Cola Company, Atlanta, GA (US)

(*) Notice: Subject to any disclaimer, the term of this patent is extended or adjusted under 35 U.S.C. 154(b) by 1138 days.

(21) Appl. No.: 17/637,005

(22) PCT Filed: Aug. 24, 2020

(86) PCT No.: PCT/US2020/047591
§ 371 (c)(1),
(2) Date: Feb. 21, 2022

(87) PCT Pub. No.: WO2021/041293
PCT Pub. Date: Mar. 4, 2021

(65) Prior Publication Data

US 2022/0287346 A1 Sep. 15, 2022

Related U.S. Application Data

(60) Provisional application No. 62/890,772, filed on Aug. 23, 2019.

(51) Int. Cl.
*A23L 33/175* (2016.01)
*A23L 2/60* (2006.01)
*A23L 33/16* (2016.01)

(52) U.S. Cl.
CPC ............... *A23L 33/175* (2016.08); *A23L 2/60* (2013.01); *A23L 33/16* (2016.08); *A23V 2002/00* (2013.01)

(58) Field of Classification Search
CPC ............................ A61K 31/195; A61K 9/0087
See application file for complete search history.

(56) References Cited

U.S. PATENT DOCUMENTS

| | | | | |
|---|---|---|---|---|
| 5,612,375 | A | 3/1997 | Haruhiko | |
| 5,968,544 | A * | 10/1999 | Howard | A23L 2/52 426/69 |
| 5,973,005 | A | 10/1999 | D'Amelio | |
| 8,354,450 | B2 * | 1/2013 | Miller | A23L 2/52 514/565 |
| 2002/0001611 | A1 | 1/2002 | Howard | |
| 2008/0233245 | A1 | 9/2008 | White et al. | |
| 2009/0186098 | A1 * | 7/2009 | Briceno | A61K 33/00 424/722 |
| 2012/0100247 | A1 | 4/2012 | Ferrante | |
| 2012/0258087 | A1 | 10/2012 | Jedlinski | |
| 2014/0255371 | A1 | 9/2014 | Roberts et al. | |
| 2017/0156359 | A1 | 6/2017 | Harrison | |

FOREIGN PATENT DOCUMENTS

| | | | |
|---|---|---|---|
| CA | 2152784 | 7/1994 | |
| CN | 1356876 | 7/2002 | |
| CN | 1286943 | 7/2003 | |
| CN | 1489943 | 4/2004 | |
| CN | 101982121 | 3/2011 | |
| CN | 103120346 | 5/2013 | |
| CN | 104489811 | 4/2015 | |
| CN | 104621671 | 5/2015 | |
| CN | 108378372 | 8/2018 | |
| CN | 108433001 | 8/2018 | |
| CN | 108576524 | 9/2018 | |
| CN | 109527313 | 3/2019 | |
| EP | 1363509 | 10/2006 | |
| WO | WO-8809132 A1 * | 12/1988 | A23L 33/175 |
| WO | WO 2014/028122 | 2/2014 | |

OTHER PUBLICATIONS

Jäger et al., Amino Acids, 2011;40:1369-1383 (Year: 2011).*
European Search Report for European Patent Application No. 2085474.8, issued Jul. 14, 2023.
International Search Report for PCT/US2020/047591, issued Nov. 30, 2020.

* cited by examiner

*Primary Examiner* — San Ming R Hui
(74) *Attorney, Agent, or Firm* — King & Spalding

(57) ABSTRACT

Acidic and near-neutral pH ready-to-drink beverages comprising creatine at least one electrolyte are provided herein.

16 Claims, No Drawings

STABLE CREATINE BEVERAGES

CROSS REFERENCE TO RELATED APPLICATIONS

This application is a national phase application under 35 U.S.C. § 371 of International Application No. PCT/US2020/047591, filed Aug. 24, 2020, which claims priority to U.S. Provisional Application No. 62/890,772, filed Aug. 23, 2019. The contents of each of the above-identified applications is hereby fully incorporated herein by reference.

FIELD OF THE INVENTION

The present invention relates to beverages containing creatine and methods of preparing such beverages.

BACKGROUND OF THE INVENTION

Creatine (also known as N-(aminoiminomethyl)-N-methylglycine; methylglycosamine or N-methyl-guanido acetic acid) is a naturally-occurring amino acid found in meat and fish, and also made by the human body in the liver, kidneys, and pancreas. Creatine can be phosphorylated into phosphocreatine, where it is stored in the muscles. During high-intensity, short-duration exercise, such as lifting weights or sprinting, phosphocreatine donates a phosphate group to adenosine diphosphate (ADP), thereby forming adenosine triphosphate (ATP) and creatine. ATP is a major source of energy within the human body. The reversible phosphorylation of creatine (i.e., both the forward and backward reaction) is catalyzed by several creatine kinases.

PCr creatine

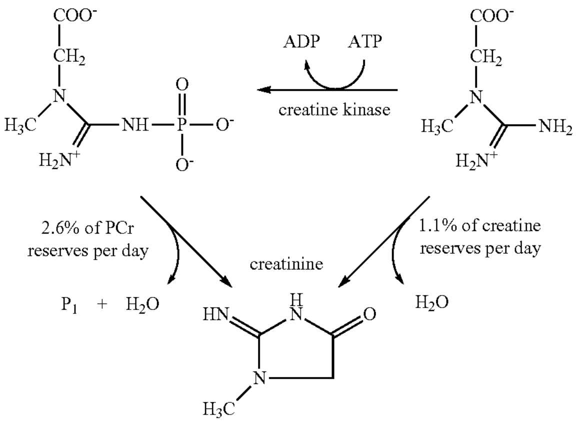

Based on the researched benefits creatine can provide during these times, consuming creatine-containing foods/supplements is a very popular trend. Supplementation with any bioavailable source of creatine (i.e., creatine supplementation) can provide improvements to athletes involved in explosive events, which include all events lasting from a few seconds to a few minutes (such as sprinting, swimming, weight-lifting, etc.). Endurance performance in events lasting longer than about 30 minutes appear less affected by creatine supplementation except where this involves short periods of increased energy output, particularly when the local muscle carbohydrate stores have become depleted.

The majority of creatine supplements are powdered dietary supplements that consumers dissolve in water or other beverages and consume within a short time following preparation. The lack of availability of ready-to-drink creatine-containing beverages is due in large part to the degradation of creatine to creatinine. Creatine degradation to creatinine is known to be dependent on both pH and temperature. The lower the pH, the faster the creatine degradation to creatinine (Edgar & Shiver, 1925 J. Am. Chem. Soc., 47, p. 1179-1188; Cannan & Shore 1928 Biochem. J. 22, p. 920-929). The higher the temperature, the faster the creatine degradation to creatinine. Naturally, creatinine waste is generated from muscle metabolism. Approximately 2% of the body's creatine is converted to creatinine every day. Creatinine is transported through the bloodstream to the kidneys. The kidneys filter out most of the creatinine and dispose of it in the urine.

EP0669083 suggests formulation of creatine-containing beverages in alkaline aqueous solutions. U.S. Pat. No. 7,150,880 utilizes the equilibration of creatine and creatinine to provide a "sufficiently stable" amount of creatine in a beverage. U.S. Pat. No. 7,150,880 describes beverage compositions comprising creatine and a quantity of creatinine sufficient to render the creatine therein substantially stable in an aqueous medium, the composition further comprising a methyl xanthine (e.g. caffeine). The creatinine content of the composition is present ab initio, rather than arising during the storage of the composition as a result of the conversion of creatine into creatinine. However, it is unclear that deliberately adding a human waste product to a beverage intended for human consumption is appropriate. U.S. Patent Application Publication No. 2002/0055540 describes that creatinine is to blame for complaints resulting from creatine consumption, namely, stomach cramps, edema, bloodedness and dehydration.

Accordingly, there remains a need for ready-to-drink beverages containing creatine, particularly acidic beverages.

SUMMARY OF THE INVENTION

In one aspect, the present invention provides acidic and near-neutral pH ready-to-drink beverages containing creatine. The beverages of the present invention have a pH below 7, contain at least one creatine compound and at least one electrolyte.

The creatine can be present in the beverage in a concentration from about 50 mg/L to about 5,000 mg/L. The at least one electrolyte is present in the beverage in a concentration of at least about 200 mg/L, such as, for example, from about 200 mg/L to about 1,000 mg/L. Exemplary electrolytes are selected from the group consisting of sodium, potassium, calcium, magnesium, chloride, phosphate, bicarbonate, and combinations thereof.

The beverages preferably also contain at least one branched-chain amino acid, and optionally include one or more sweeteners, functional ingredients and/or additives.

The beverages of the present invention exhibit shelf-stability and are stable at refrigeration temperatures. For example, the creatine concentration of a beverage of the present invention after three months of storage at 5 °C is at least 90% of the initial creatine concentration. In another example, the creatine concentration of a beverage of the present invention after three months of storage at ambient temperature is at least 40% of the initial creatine concentration.

DETAILED DESCRIPTION OF THE INVENTION

I. Definitions

"Creatine compound" as used herein, refers to creatine (N-(aminoiminomethyl)-N-methylglycine; methylglycosamine or N-methyl-guanido acetic acid) and all bioavailable derivatives thereof. Exemplary creatine compounds include, but are not limited to, creatine monohydrate, creatine nitrate, phosphocreatine, creatine methyl ester, creatine ethyl ester, creatine ethyl ester malate, creatine malate, creatine gluconate, creatine hydrochloride, tricreatine malate, tricreatine orotate, creatine citrate, creatine pyruvate and creatine alphaketoglutarate.

"Beverage", as used herein, refers to liquids suitable for human consumption.

II. Beverages

The present invention provides acidic ready-to-drink beverages comprising at least one creatine compound and at least one electrolyte.

Ready-to-drink beverages include carbonated and non-carbonated beverages. Carbonated beverages include, but are not limited to, frozen carbonated beverages, enhanced sparkling beverages, cola, fruit-flavored sparkling beverages (e.g. lemon-lime, orange, grape, strawberry and pineapple), ginger-ale, soft drinks and root beer. Non-carbonated beverages include, but are not limited to, fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, beverage containing milk components (e.g. milk beverages, coffee containing milk components, café au lait, milk tea, fruit milk beverages), beverages containing cereal extracts and smoothies.

In a particular embodiment, the present invention relates to a sports drink or an enhanced water drink.

The beverage can be a full-calorie beverage that has up to about 120 calories per 8 oz serving.

The beverage can be a mid-calorie beverage that has up to about 60 calories per 8 oz. serving.

The beverage can be a low-calorie beverage that has up to about 40 calories per 8 oz. serving.

The beverage can be a zero-calorie that has less than about 5 calories per 8 oz. serving.

In another particular embodiment, the beverage does not contain milk and/or dairy components. In another particular embodiment, the beverage does not contain added creatinine.

In one embodiment, the pH of the beverage is below 7, e.g. the pH of the beverage is <7. Exemplary pH ranges for beverages of the present invention are from about 1 to <7, from about 2 to <7, from about 3 to <7, from about 4 to <7, from 5 about to <7 and from 6 about to <7.

In more particular embodiments, the pH of the beverage is from about 1 to about 6, from about 1 to about 5, from about 1 to about 4, from about 1 to about 3, from about 1 to about 2, from about 2 to about 6, from about 2 to about 5, from about 2 to about 4, from about 2 to about 3, from about 3 to about 6, from about 3 to about 5, from about 3 to about 4, from about 4 to about 6, from about 4 to about 5 or from about 5 to about 6.

In some embodiments, the pH of the beverage is measured at the time the beverage is formulated, i.e. ab initio. In other embodiments, the pH can be measured at other times, e.g. 24 hours after formulation, 48 hours after formulation, 1 week after formulation, 2 weeks after formulation, 3 weeks after formulation, 4 weeks after formulation, 5 weeks after formulation, 6 weeks after formulation, 7 weeks after formulation, 8 weeks after formulation or 3 months after formulation.

The pH of the beverage can be impacted by degradation of creatine to creatinine. Accordingly, pH can be used to measure the stability of the beverage. In some embodiments, the pH of the beverage does not substantially change over a period of at least 48 hours after formulation, such as, for example, at least 1 week after formulation, at least 2 weeks after formulation, at least 3 weeks after formulation, at least 4 weeks after formulation, at least 5 weeks after formulation, at least 6 weeks after formulation, at least 7 weeks after formulation, at least 8 weeks after formulation or at least 3 months after formulation. A "substantial change" in pH is defined herein as a change greater than ±1.0 of the subsequent measurement from the initial measurement.

Creatine stability can also be measured by determining the concentration of creatine in a sample by high-performance liquid chromatography (HPLC). Methods of measuring creatine by HPLC are known in the art, e.g. Analytical Biochemistry 214, pp. 278-283 (1993). An exemplary method is also provided in Example 1, infra.

Beverages of the present invention exhibit minimal creatine degradation over a period of at least three months when stored at 5 °C. In particular embodiments, the creatine concentration of the beverage after three months of storage at 5 °C is at least 90% of the initial creatine concentration, at least 95% of the initial creatine concentration, at least 97% of the initial creatine concentration, at least 98% of the initial creatine concentration, or at least 99% of the initial creatine concentration. "Initial concentration" refers to the concentration of creatine measured upon formulation, e.g. within 24 hours of preparing the beverage.

In other embodiments, the creatine concentration of the beverage is at least 90% of the initial creatine concentration when stored at 5 °C for four months, five months, six months, seven months, eight months, nine months, ten months, eleven months or twelve months.

In still other embodiments, the creatine concentration of the beverage is at least 75% of the initial creatine concentration when stored at 5 °C for four months, five months, six months, seven months, eight months, nine months, ten months, eleven months or twelve months.

Beverages of the present invention also exhibit shelf stability, i.e. the creatine concentration of the beverage after three months of storage at ambient temperature (about 20 °C) is at least 40% of the initial creatine concentration at least 45% of the initial concentration or at least 50% of the initial creatine concentration. In more particular embodiments, the creatine concentration of the beverage is at least 40% of the initial creatine concentration when stored at ambient temperature for four months, five months, six months, seven months, eight months, nine months, ten months, eleven months or twelve months.

The concentration of creatine in the beverage can be from about 50 mg/L to about 5,000 mg/L, such as, for example, from about 100 mg/L to about 5,000 mg/L, from about 500 mg/L to about 5,000 mg/L, from about 1,000 mg/L to about 5,000 mg/L, from about 2,000 mg/L to about 5,000 mg/L, from about 3,000 mg/L to about 5,000 mg/L and from about 4,000 mg/L to about 5,000 mg. In a particular embodiment, the concentration of creatine refers to the initial concentration of creatine.

The stability of creatine in the present acidic beverage formulations is attributed to the presence of certain electrolytes. Not wishing to be bound by theory, it is believed that electrolytes in the form of salts stabilize the creatine molecule by binding at the sites shown below and preventing intramolecular reaction resulting in creatinine, as shown below.

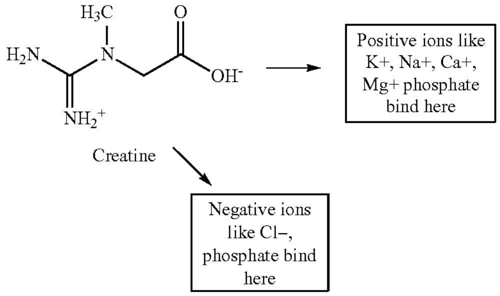

Creatine

A. Electrolyte

Ready-to-drink beverages of the present invention contain at least one electrolyte. Non-limiting examples of electrolytes include sodium, potassium, calcium, magnesium, chloride, phosphate, bicarbonate, and combinations thereof. The electrolytes and ionic components for the present invention are usually, but not necessarily, obtainable from their corresponding water-soluble and non-toxic salts. Unless otherwise defined, the amount of electrolytes or ionic components in the beverage is based on those present in the final drinkable beverage composition. The electrolyte concentration is of the ion only and not the salt.

The beverages of the present invention preferably contain a total electrolyte concentration of at least about 200 mg/L, at least about 300 mg/L, at least about 400 mg/L, at least about 500 mg/L, at least about 600 mg/L, at least about 700 mg/L or at least about 800 mg/L. In a particular embodiment, the beverages contain an electrolyte concentration from about 400 mg/L to about 1,000 mg/L, from about 400 mg/L to about 900 mg/L, from about 400 mg/L to about 800 mg/L, from about 400 mg/L to about 700 mg/L, from about 400 mg/L to about 600 mg/L, from about 400 mg/L to about 500 mg/L, from about 500 mg/L to about 1,000 mg/L.

The potassium ion component can be provided by any salt including the chloride, carbonate, sulfate, acetate, bicarbonate, citrate, phosphate, hydrogen phosphate, tartrate, sorbate or a combination thereof. The potassium ions are preferably present in the beverage of the present invention in an amount of at least 0.0025% to about 0.08% by weight, from about 0.0075% to about 0.06% or from about 0.0075% to about 0.015%.

The beverage of the present invention can contain from about 5 mg/L to about 1,000 mg/L potassium, more preferably from about 50 mg/L to about 300 mg/L, such as, for example, from about 100 mg/L to about 300 mg/L, from about 200 mg/L to about 300 mg/L, from about 50 mg/L to about 200 mg/L, from about 100 mg/L to about 200 mg/L or from about 100 mg/L to about 200 mg/L.

The sodium ion component can be provided by any salt such as the chloride, carbonate, sulfate, acetate, bicarbonate, citrate, phosphate, hydrogen phosphate, tartrate, sorbate or a combination thereof. The sodium ions are preferably present in the beverage of the present invention in an amount of at least about 0.005% to about 0.1% by weight, from about 0.0075% to about 0.075% or about 0.015% to about 0.05%.

The beverage of the present invention can contain from about 5 mg/L to about 1,000 mg/L sodium, more preferably from about 300 mg/L to about 800 mg/L sodium, such as, for example, from about 300 mg/L to about 700 mg/L, from about 300 mg/L to about 600 mg/L, from about 300 mg/L to about 500 mg/L, from about 300 mg/L to about 400 mg/L, from about 400 mg/L to about 800 mg/L, from about 400 mg/L to about 700 mg/L, from about 400 mg/L to about 600 mg/L from about 400 mg/L to about 500 mg/L, from about 500 mg/L to about 800 mg/L, from about 500 mg/L to about 700 mg/L, from about 500 mg/L to about 600 mg/L, from about 600 mg/L to about 800 mg/L, from about 600 mg/L to about 700 mg/L and from about 700 mg/L to about 800 mg/L. In a particular embodiment, the beverages of the present invention contain from about 600 mg/L to about 700 mg/L sodium.

The calcium ion component can be provided by any salt such as the chloride, carbonate, sulfate, acetate, bicarbonate, citrate, phosphate, hydrogen phosphate, tartrate, sorbate or a combination thereof. The calcium ions are preferably present in the beverage of the present invention in an amount of at least about 0.0005% to about 0.010% by weight.

The beverage of the present invention can contain from about 5 mg/L to about 1,000 mg/L calcium, more preferably from about 1 mg/L to about 50 mg/L, such as, for example, from about 5 mg/L to about 10 mg/L.

The magnesium ion component can be provided by any salt such as the chloride, carbonate, sulfate, acetate, bicarbonate, citrate, phosphate, hydrogen phosphate, tartrate, sorbate or a combination thereof. The magnesium ions are preferably present in the beverage of the present invention in an amount of at least about 0.0005% to about 0.010% by weight.

The beverage of the present invention can contain from about 5 mg/L to about 1,000 mg/L magnesium, more preferably from about 1 mg/L to about 50 mg/L, such as, for example, from about 5 mg/L to about 20 mg/L.

The beverage can contain chloride ion from about 0.005% to about 0.20% by weight, from about 0.01% to about 0.15% or from about 0.02% to about 0.075%. The chloride ion component can be provided by a salt such as sodium chloride, potassium chloride or a combination thereof.

In a particular embodiment, a beverage of the present invention contains at least one electrolyte selected from the group consisting of sodium, potassium, magnesium, calcium and combinations thereof. In another particular embodiment, a beverage of the present invention contains at least one electrolyte selected from the group consisting of sodium, potassium, magnesium, calcium and combinations thereof, wherein the amount of each electrolyte is as provided above.

B. Branched Chain Amino Acid (BCAA)

A branched-chain amino acid (BCAA) is an amino acid having an aliphatic side-chain with a branch (a central carbon atom bound to three or more carbon atoms). Ready-to-drink beverages of the present invention contain at least one branched-chain amino acid. There are three proteinogenic BCAA: leucine, isoleucine, and valine. Non-proteinogenic BCAAs include 2-aminoisobutyric acid. In a particular embodiment, a beverage comprises at least one of leucine, isoleucine and/or valine. In a more particular embodiment, a beverage comprises leucine, isoleucine and valine. The BCAA can be in the D- or L-configuration.

Beverages of the present invention preferably contain a total BCAA concentration from about 50 mg/L (ppm) to about 5,000 mg/L, such as, for example, from about 1,000 mg/L to about 5,000 mg/L, from about 2,000 mg/L to about 5,000 mg/L, from about 3,000 mg/L to about 5,000 mg/L, from about 4,000 mg/L to about 5,000 mg/L, from about 1,000 mg/L to about 4,000 mg/L, from about 2,000 mg/L to about 4,000 mg/L, from about 3,000 mg/L to about 4,000 mg/L, from about 1,000 mg/L to about 3,000 mg/L, from about 2,000 mg/L to about 3,000 mg/L or from about 1,000 mg/L to about 2,000 mg/L.

In a particular embodiment, a beverage of the present invention contains about 2,000 mg/L to about 3,000 mg/L BCAA.

C. Beverage Components

The ready-to-drink beverages of the present invention can contain additional typical beverage ingredients, e.g. at least one sweetener and/or at least one functional ingredient and/or at least one additive.

The sweetener can be a natural sweetener, a natural high potency sweetener or synthetic sweetener. As used herein, the phrase "natural high potency sweetener" (NHPS) refers to any sweetener found naturally in nature and characteristically has a sweetness potency greater than sucrose, fructose, or glucose, yet has less calories. The natural high potency sweetener can be provided as a pure compound or, alternatively, as part of an extract. As used herein, the phrase "synthetic sweetener" refers to any composition which is not found naturally in nature and characteristically has a sweetness potency greater than sucrose, fructose, or glucose, yet has less calories.

Non-limiting examples of NHPSs includes stevia and steviolglycosides, such as rebaudioside M, rebaudioside D, rebaudioside A, rebaudioside N, rebaudioside O, rebaudioside E, steviolmonoside, steviolbioside, rubusoside, dulcoside B, dulcoside A, rebaudioside B, rebaudioside G, stevioside, rebaudioside C, rebaudioside F, rebaudioside I, rebaudioside H, rebaudioside L, rebaudioside K, rebaudioside J, rebaudioside M2, rebaudioside D2, rebaudioside S, rebaudioside T, rebaudioside U, rebaudioside V, rebaudioside W, rebaudioside Z1, rebaudioside Z2, rebaudioside IX, enzymatically glucosylated steviol glycosides and combinations thereof.

In certain embodiments, a steviol glycoside blend comprises at least about 5% steviol glycoside by weight, such as, for example, at least about 10%, at least about 20%, at least about 30%, at least about 40%, at least about 50%, at least about 60%, at least about 70%, at least about 80%, at least about 90%, at least about 95% or at least about 97%.

In exemplary embodiments, the steviol glycoside blend comprises at least about 50% steviol glycoside by weight, such as, for example, from about 50% to about 90%, from about 50% to about 80%, from about 50% to about 70%, from about 50% to about 60%, from about 60% to about 90%, from about 60% to about 80%, from about 60% to about 70%, from about 70% to about 90%, from about 70% to about 80% and from about 80% to about 90%.

Another exemplary NHPS is Luo Han Guo and the related mogroside compounds, such as grosmogroside I, mogroside IA, mogroside IE, 11-oxomogroside IA, mogroside II, mogroside II A, mogroside II B, mogroside II E, 7-oxomogroside II E, mogroside III, Mogroside IIIe, 11-oxomogroside IIIE, 11-deoxymogroside III, mogroside IV, Mogroside IVA 11-oxomogroside IV, 11-oxomogroside IVA, mogroside V, isomogroside V, 11-deoxymogroside V, 7-oxomogroside V, 11-oxomogroside V, isomogroside V, mogroside VI, mogrol, 11-oxomogrol, siamenoside I, isomers of siamenoside I (e.g. those disclosed in 20170119032; incorporated by reference in its entirety), (3β,9β,10α,11α,24R)-3-[(4-O-β-D-glucospyranosyl-6-O-β-D-glucopyranosyl]-25-hydroxyl-9-methyl-19-norlanost-5-en-24-yl-[2-O-β-D-glucopyranosyl-6-O-β-D-glucopyranosyl]-β-D-glucopyranoside); (3β, 9β, 10α, 11α, 24R)-[(2-O-β-D-glucopyranosyl-6-O-β-D-glucopyranosyl-β-D-glucopyranosyl)oxy]-25-hydroxy-9-methyl-19-norlanost-5-en-24-yl-[2-O-β-D-glucopyranosyl-6-O-β-D-glucopyranosyl]-β-D-glucopyranoside); and (3β, 9β, 10α, 11α, 24R)-[(2-O-β-D-glucopyranosyl-6-O-β-D-glucopyranosyl-β-D-glucopyranosyl)oxy]-25-hydroxy-9-methyl-19-norlanost-5-en-24-yl-[2-O-β-D-glucopyranosyl-6-O-β-D-glucopyranosyl]-β-D-glucopyranoside), In certain embodiments, a mogroside blend comprises at least about 5% of the mogroside by weight, such as, for example, at least about 10%, at least about 20%, at least about 30%, at least about 40%, at least about 50%, at least about 60%, at least about 70%, at least about 80%, at least about 90%, at least about 95% or at least about 97%.

Other exemplary NHPSs include monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, and cyclocarioside I.

In one embodiment, the sweetener is a carbohydrate sweetener. Suitable carbohydrate sweeteners include, but not limited to, the group consisting of sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, fucose, rhamnose, arabinose, turanose, sialose and combinations thereof.

Other suitable sweeteners include siamenoside, monatin and its salts (monatin SS, RR, RS, SR), curculin, mogrosides, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I, sugar alcohols such as erythritol, sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof.

In one embodiment, the sweetener is a caloric sweetener or mixture of caloric sweeteners. In another embodiment, the caloric sweetener is selected from sucrose, fructose, glucose, high fructose corn/starch syrup, a beet sugar, a cane sugar, and combinations thereof.

In another embodiment, the sweetener is a rare sugar selected from allulose, gulose, kojibiose, sorbose, lyxose, ribulose, xylose, xylulose, D-allose, L-ribose, D-tagatose, L-glucose, L-fucose, L-arabinose, turanose and combinations thereof.

The amount of sweetener in the ready-to-drink beverage depends on the identity of the sweetener and the desired level of sweetness. In preferred embodiments, the sweetener is present in a sweetening amount, i.e. a concentration that is detectably sweet.

As would be understood by a person of skill in the art, high potency sweeteners are more potent and therefore lower concentrations are required to achieve a particular sucrose equivalence (SE). The sweetness of a non-sucrose sweetener can be measured against a sucrose reference by determining the non-sucrose sweetener's sucrose equivalence (SE). Typically, taste panelists are trained to detect sweetness of reference sucrose solutions containing between 1-15% sucrose (w/v). Other non-sucrose sweeteners are then tasted at a series of dilutions to determine the concentration of the non-sucrose sweetener that is as sweet as a given percent sucrose reference. For example, if a 1% solution of a non-sucrose sweetener is as sweet as a 10% sucrose solution, then the sweetener is said to be 10 times as potent as sucrose, and has 10% sucrose equivalence.

In one embodiment, the sweetener or sweeteners provides the ready-to-drink beverage with a sucrose equivalence of about 1% (w/v), such as, for example, about 2%, about 3%, about 4%, about 5%, about 6%, about 7%, about 8%, about 9%, about 10%, about 11%, about 12%, about 13%, about 14% or any range between these values.

In another embodiment, the ready-to-drink beverage of the present invention has a SE from about 2% to about 14%, such as, for example, from about 2% to about 10%, from about 2% to about 5%, from about 5% to about 15%, from about 5% to about 10% or from about 10% to about 15%.

The amount of sucrose, and thus another measure of sweetness, in a reference solution may be described in degrees Brix (° Bx). One degree Brix is 1 gram of sucrose in 100 grams of solution and represents the strength of the solution as percentage by weight (% w/w) (strictly speaking, by mass). In embodiments where the ready-to-drink beverages are sweetened with sucrose, the beverage can be about 1 degree Brix, about 2 degrees Brix, about 3 degrees Brix, about 4 degrees Brix, about 5 degrees Brix, about 6 degrees Brix, about 7 degrees Brix, about 8 degrees Brix, about 9 degrees Brix, about 10 degrees Brix, about 11 degrees Brix, about 12 degrees Brix, about 13 degrees Brix, about 14 degrees Brix or any range between these values.

Exemplary functional ingredients include, but are not limited to, saponins, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof.

In certain embodiments, the functional ingredient is at least one saponin. As used herein, the at least one saponin may comprise a single saponin or a plurality of saponins as a functional ingredient for the composition provided herein. Saponins are glycosidic natural plant products comprising an aglycone ring structure and one or more sugar moieties. Non-limiting examples of specific saponins for use in particular embodiments of the invention include group A acetyl saponin, group B acetyl saponin, and group E acetyl saponin. Several common sources of saponins include soybeans, which have approximately 5% saponin content by dry weight, soapwort plants (*Saponaria*), the root of which was used historically as soap, as well as alfalfa, aloe, asparagus, grapes, chickpeas, yucca, and various other beans and weeds. Saponins may be obtained from these sources by using extraction techniques well known to those of ordinary skill in the art. A description of conventional extraction techniques can be found in U.S. Pat. Appl. No. 2005/0123662.

In certain embodiments, the functional ingredient is at least one antioxidant. As used herein, "antioxidant" refers to any substance which inhibits, suppresses, or reduces oxidative damage to cells and biomolecules.

Examples of suitable antioxidants for embodiments of this invention include, but are not limited to, vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, and combinations thereof. In some embodiments, the antioxidant is vitamin A, vitamin C, vitamin E, ubiquinone, mineral selenium, manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone, phytoestrogens, genistein, daidzein, glycitein, anythocyanins, cyaniding, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-α-lipoic acid, N-acetylcysteine, emblicanin, apple extract, apple skin extract (applephenon), rooibos extract red, rooibos extract, green, hawthorn berry extract, red raspberry extract, green coffee antioxidant (GCA), aronia extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, wolfberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. In alternate embodiments, the antioxidant is a synthetic antioxidant such as butylated hydroxytolune or butylated hydroxyanisole, for example. Other sources of suitable antioxidants for embodiments of this invention include, but are not limited to, fruits, vegetables, tea, cocoa, chocolate, spices, herbs, rice, organ meats from livestock, yeast, whole grains, or cereal grains.

Particular antioxidants belong to the class of phytonutrients called polyphenols (also known as "polyphenolics"), which are a group of chemical substances found in plants, characterized by the presence of more than one phenol group per molecule. Suitable polyphenols for embodiments of this invention include catechins, proanthocyanidins, procyanidins, anthocyanins, quercerin, rutin, reservatrol, isoflavones, curcumin, punicalagin, ellagitannin, hesperidin, naringin, citrus flavonoids, chlorogenic acid, other similar materials, and combinations thereof.

In one embodiment, the antioxidant is a catechin such as, for example, epigallocatechin gallate (EGCG). In another embodiment, the antioxidant is chosen from proanthocyanidins, procyanidins or combinations thereof. In particular embodiments, the antioxidant is an anthocyanin. In still other embodiments, the antioxidant is chosen from quercetin, rutin or combinations thereof. In one embodiment, the antioxidant is reservatrol. In another embodiment, the antioxidant is an isoflavone. In still another embodiment, the antioxidant is curcumin. In a yet further embodiment, the antioxidant is chosen from punicalagin, ellagitannin or combinations thereof. In a still further embodiment, the antioxidant is chlorogenic acid.

In certain embodiments, the functional ingredient is at least one dietary fiber. Numerous polymeric carbohydrates having significantly different structures in both composition and linkages fall within the definition of dietary fiber. Such compounds are well known to those skilled in the art, non-limiting examples of which include non-starch polysaccharides, lignin, cellulose, methylcellulose, the hemicelluloses, β-glucans, pectins, gums, mucilage, waxes, inulins, oligosaccharides, fructooligosaccharides, cyclodextrins, chitins, and combinations thereof. Although dietary fiber generally is derived from plant sources, indigestible animal products such as chitins are also classified as dietary fiber. Chitin is a polysaccharide composed of units of acetylglucosamine joined by β(1-4) linkages, similar to the linkages of cellulose.

In certain embodiments, the functional ingredient is at least one fatty acid. As used herein, "fatty acid" refers to any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. As used herein, "long chain polyunsaturated fatty acid" refers to any polyunsaturated carboxylic acid or organic acid with a long aliphatic tail. As used herein, "omega-3 fatty acid" refers to any polyunsaturated fatty acid having a first double bond as the third carbon-carbon bond from the terminal methyl end of its carbon chain. In particular embodiments, the omega-3 fatty acid may comprise a long chain omega-3 fatty acid. As used herein, "omega-6 fatty acid" any polyunsaturated fatty acid having a first double bond as the sixth carbon-carbon bond from the terminal methyl end of its carbon chain.

Suitable omega-3 fatty acids for use in embodiments of the present invention can be derived from algae, fish, animals, plants, or combinations thereof, for example. Examples of suitable omega-3 fatty acids include, but are not limited to, linolenic acid, alpha-linolenic acid, eicosapentaenoic acid, docosahexaenoic acid, stearidonic acid, eicosatetraenoic acid and combinations thereof. In some embodiments, suitable omega-3 fatty acids can be provided in fish oils, (e.g., menhaden oil, tuna oil, salmon oil, bonito oil, and cod oil), microalgae omega-3 oils or combinations thereof. In particular embodiments, suitable omega-3 fatty acids may be derived from commercially available omega-3 fatty acid oils such as Microalgae DHA oil (from Martek, Columbia, MD), OmegaPure (from Omega Protein, Houston, TX), Marinol C-38 (from Lipid Nutrition, Channahon, IL), Bonito oil and MEG-3 (from Ocean Nutrition, Dartmouth, NS), Evogel (from Symrise, Holzminden, Germany), Marine Oil, from tuna or salmon (from Arista Wilton, CT), OmegaSource 2000, Marine Oil, from menhaden and Marine Oil, from cod (from OmegaSource, RTP, NC).

Suitable omega-6 fatty acids include, but are not limited to, linoleic acid, gamma-linolenic acid, dihommo-gamma-linolenic acid, arachidonic acid, eicosadienoic acid, docosadienoic acid, adrenic acid, docosapentaenoic acid and combinations thereof.

Suitable esterified fatty acids for embodiments of the present invention include, but are not limited to, monoacylgycerols containing omega-3 and/or omega-6 fatty acids, diacylgycerols containing omega-3 and/or omega-6 fatty acids, or triacylgycerols containing omega-3 and/or omega-6 fatty acids and combinations thereof.

In certain embodiments, the functional ingredient is at least one vitamin. Suitable vitamins include, vitamin A, vitamin D, vitamin E, vitamin K, vitamin B1, vitamin B2, vitamin B3, vitamin B5, vitamin B6, vitamin B7, vitamin B9, vitamin B12, and vitamin C.

Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methylmethionine. As used herein, the term vitamin includes pseudo-vitamins. In some embodiments, the vitamin is a fat-soluble vitamin chosen from vitamin A, D, E, K and combinations thereof. In other embodiments, the vitamin is a water-soluble vitamin chosen from vitamin B1, vitamin B2, vitamin B3, vitamin B6, vitamin B12, folic acid, biotin, pantothenic acid, vitamin C and combinations thereof.

In certain embodiments, the functional ingredient is glucosamine, optionally further comprising chondroitin sulfate.

In certain embodiments, the functional ingredient is at least one mineral. Minerals, in accordance with the teachings of this invention, comprise inorganic chemical elements required by living organisms. Minerals are comprised of a broad range of compositions (e.g., elements, simple salts, and complex silicates) and also vary broadly in crystalline structure. They may naturally occur in foods and beverages, may be added as a supplement, or may be consumed or administered separately from foods or beverages.

Minerals may be categorized as either bulk minerals, which are required in relatively large amounts, or trace minerals, which are required in relatively small amounts. Bulk minerals generally are required in amounts greater than or equal to about 100 mg per day and trace minerals are those that are required in amounts less than about 100 mg per day.

In one embodiment, the mineral is chosen from bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, and iodine. Although iodine generally is classified as a trace mineral, it is required in larger quantities than other trace minerals and often is categorized as a bulk mineral.

In a particular embodiment, the mineral is a trace mineral, believed to be necessary for human nutrition, non-limiting examples of which include bismuth, boron, lithium, nickel, rubidium, silicon, strontium, tellurium, tin, titanium, tungsten, and vanadium.

The minerals embodied herein may be in any form known to those of ordinary skill in the art. For example, in one embodiment, the minerals may be in their ionic form, having either a positive or negative charge. In another embodiment, the minerals may be in their molecular form. For example, sulfur and phosphorous often are found naturally as sulfates, sulfides, and phosphates.

In certain embodiments, the functional ingredient is at least one preservative. In particular embodiments, the preservative is chosen from antimicrobials, antioxidants, anti-enzymatics or combinations thereof. Non-limiting examples of antimicrobials include sulfites, propionates, benzoates, sorbates, nitrates, nitrites, bacteriocins, salts, sugars, acetic acid, dimethyl dicarbonate (DMDC), ethanol, and ozone. In one embodiment, the preservative is a sulfite. Sulfites include, but are not limited to, sulfur dioxide, sodium bisulfite, and potassium hydrogen sulfite. In another embodiment, the preservative is a propionate. Propionates include, but are not limited to, propionic acid, calcium propionate, and sodium propionate. In yet another embodiment, the preservative is a benzoate. Benzoates include, but are not limited to, sodium benzoate and benzoic acid. In still another embodiment, the preservative is a sorbate. Sorbates include, but are not limited to, potassium sorbate, sodium sorbate, calcium sorbate, and sorbic acid. In a still further embodiment, the preservative is a nitrate and/or a nitrite. Nitrates and nitrites include, but are not limited to, sodium nitrate and sodium nitrite. In another embodiment, the at least one preservative is a bacteriocin, such as, for example, nisin. In still another embodiment, the preservative is ethanol. In yet another embodiment, the preservative is ozone. Non-limiting examples of antienzymatics suitable for use as preservatives in particular embodiments of the invention include ascorbic acid, citric acid, and metal chelating agents such as ethylenediaminetetraacetic acid (EDTA).

In certain embodiments, the functional ingredient is at least one hydration agent. In another particular embodiment, the hydration agent is a carbohydrate to supplement energy stores burned by muscles. Suitable carbohydrates for use in particular embodiments of this invention are described in U.S. Pat. Nos. 4,312,856, 4,853,237, 5,681,569, and 6,989,171. Non-limiting examples of suitable carbohydrates include monosaccharides, disaccharides, oligosaccharides, complex polysaccharides or combinations thereof. Non-limiting examples of suitable types of monosaccharides for use in particular embodiments include trioses, tetroses, pentoses, hexoses, heptoses, octoses, and nonoses. Non-limiting examples of specific types of suitable monosaccharides include glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, and sialose. Non-limiting examples of suitable disaccharides include sucrose, lactose, and maltose. Non-limiting examples of suitable oligosaccharides include saccharose, maltotriose, and maltodextrin. In other particular embodiments, the carbohydrates are provided by a corn syrup, a beet sugar, a cane sugar, a juice, or a tea.

In another particular embodiment, the hydration agent is a flavanol that provides cellular rehydration. Flavanols are a class of natural substances present in plants, and generally comprise a 2-phenylbenzopyrone molecular skeleton attached to one or more chemical moieties. Non-limiting examples of suitable flavanols for use in particular embodiments of this invention include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof. Several common sources of flavanols include tea plants, fruits, vegetables, and flowers. In preferred embodiments, the flavanol is extracted from green tea.

In a particular embodiment, the hydration agent is a glycerol solution to enhance exercise endurance. The ingestion of a glycerol containing solution has been shown to provide beneficial physiological effects, such as expanded blood volume, lower heart rate, and lower rectal temperature.

In certain embodiments, the functional ingredient is chosen from at least one probiotic, prebiotic and combination thereof. The probiotic is a beneficial microorganism that affects the human body's naturally-occurring gastrointestinal microflora. Examples of probiotics include, but are not limited to, bacteria of the genus *Lactobacilli, Bifidobacteria, Streptococci*, or combinations thereof, that confer beneficial effects to humans. In particular embodiments of the invention, the at least one probiotic is chosen from the genus *Lactobacilli*. According to other particular embodiments of this invention, the probiotic is chosen from the genus *Bifidobacteria*. In a particular embodiment, the probiotic is chosen from the genus *Streptococcus*.

Probiotics that may be used in accordance with this invention are well-known to those of skill in the art. Non-limiting examples of foodstuffs comprising probiotics include yogurt, sauerkraut, kefir, kimchi, fermented vegetables, and other foodstuffs containing a microbial element that beneficially affects the host animal by improving the intestinal microbalance.

Prebiotics, in accordance with the embodiments of this invention, include, without limitation, mucopolysaccharides, oligosaccharides, polysaccharides, amino acids, vitamins, nutrient precursors, proteins and combinations thereof. According to a particular embodiment of this invention, the prebiotic is chosen from dietary fibers, including, without limitation, polysaccharides and oligosaccharides. Non-limiting examples of oligosaccharides that are categorized as prebiotics in accordance with particular embodiments of this invention include fructooligosaccharides, inulins, isomalto-oligosaccharides, lactilol, lactosucrose, lactulose, pyrodextrins, soy oligosaccharides, transgalacto-oligosaccharides, and xylo-oligosaccharides. In other embodiments, the prebiotic is an amino acid. Although a number of known prebiotics break down to provide carbohydrates for probiotics, some probiotics also require amino acids for nourishment.

Prebiotics are found naturally in a variety of foods including, without limitation, bananas, berries, asparagus, garlic, wheat, oats, barley (and other whole grains), flaxseed, tomatoes, Jerusalem artichoke, onions and chicory, greens (e.g., dandelion greens, spinach, collard greens, chard, kale, mustard greens, turnip greens), and legumes (e.g., lentils, kidney beans, chickpeas, navy beans, white beans, black beans).

In certain embodiments, the functional ingredient is at least one weight management agent. As used herein, "a weight management agent" includes an appetite suppressant and/or a thermogenesis agent. As used herein, the phrases "appetite suppressant", "appetite satiation compositions", "satiety agents", and "satiety ingredients" are synonymous. The phrase "appetite suppressant" describes macronutrients, herbal extracts, exogenous hormones, anorectics, anorexigenics, pharmaceutical drugs, and combinations thereof, that when delivered in an effective amount, suppress, inhibit, reduce, or otherwise curtail a person's appetite. The phrase "thermogenesis agent" describes macronutrients, herbal extracts, exogenous hormones, anorectics, anorexigenics, pharmaceutical drugs, and combinations thereof, that when delivered in an effective amount, activate or otherwise enhance a person's thermogenesis or metabolism.

Suitable weight management agents include macronutrients selected from the group consisting of proteins, carbohydrates, dietary fats, and combinations thereof. Consumption of proteins, carbohydrates, and dietary fats stimulates the release of peptides with appetite-suppressing effects. For example, consumption of proteins and dietary fats stimulates the release of the gut hormone cholecytokinin (CCK), while consumption of carbohydrates and dietary fats stimulates release of Glucagon-like peptide 1 (GLP-1).

Suitable macronutrient weight management agents also include carbohydrates. Carbohydrates generally comprise sugars, starches, cellulose and gums that the body converts into glucose for energy. Carbohydrates often are classified into two categories, digestible carbohydrates (e.g., monosaccharides, disaccharides, and starch) and non-digestible carbohydrates (e.g., dietary fiber). Studies have shown that non-digestible carbohydrates and complex polymeric carbohydrates having reduced absorption and digestibility in the small intestine stimulate physiologic responses that inhibit food intake. Accordingly, the carbohydrates embodied herein desirably comprise non-digestible carbohydrates or carbohydrates with reduced digestibility. Non-limiting examples of such carbohydrates include polydextrose; inulin; monosaccharide-derived polyols such as erythritol, mannitol, xylitol, and sorbitol; disaccharide-derived alcohols such as isomalt, lactitol, and maltitol; and hydrogenated starch hydrolysates. Carbohydrates are described in more detail herein below.

In another particular embodiment, the weight management agent is a dietary fat. Dietary fats are lipids comprising combinations of saturated and unsaturated fatty acids. Polyunsaturated fatty acids have been shown to have a greater satiating power than mono-unsaturated fatty acids. Accordingly, the dietary fats embodied herein desirably comprise poly-unsaturated fatty acids, non-limiting examples of which include triacylglycerols.

In another particular embodiment, the weight management agent is an herbal extract. Extracts from numerous types of plants have been identified as possessing appetite suppressant properties. Non-limiting examples of plants whose extracts have appetite suppressant properties include plants of the genus *Hoodia, Trichocaulon, Caralluma, Stapelia, Orbea, Asclepias*, and *Camelia*. Other embodiments include extracts derived from Gymnema Sylvestre, Kola Nut, Citrus Auran tium, Yerba Mate, Griffonia Simplicifolia, Guarana, myrrh, guggul Lipid, and black current seed oil.

The herbal extracts may be prepared from any type of plant material or plant biomass. Non-limiting examples of plant material and biomass include the stems, roots, leaves, dried powder obtained from the plant material, and sap or dried sap. The herbal extracts generally are prepared by extracting sap from the plant and then spray-drying the sap. Alternatively, solvent extraction procedures may be employed. Following the initial extraction, it may be desirable to further fractionate the initial extract (e.g., by column chromatography) in order to obtain an herbal extract with enhanced activity. Such techniques are well known to those of ordinary skill in the art.

In one embodiment, the herbal extract is derived from a plant of the genus *Hoodia*. A sterol glycoside of *Hoodia*, known as P57, is believed to be responsible for the appetite-suppressant effect of the *Hoodia* species. In another embodiment, the herbal extract is derived from a plant of the genus *Caralluma*, non-limiting examples of which include caratuberside A, caratuberside B, bouceroside I, bouceroside II, bouceroside III, bouceroside IV, bouceroside V, bouceroside VI, bouceroside VII, bouceroside VIII, bouceroside IX, and bouceroside X. In another embodiment, the at least one herbal extract is derived from a plant of the genus *Trichocaulon*. *Trichocaulon* plants are succulents that generally are native to southern Africa, similar to *Hoodia*, and include the species *T. piliferum* and *T. officinale*. In another embodiment, the herbal extract is derived from a plant of the genus *Stapelia* or *Orbea*. Not wishing to be bound by any theory, it is believed that the compounds exhibiting appetite suppressant activity are saponins, such as pregnane glycosides, which include stavarosides A, B, C, D, E, F, G, H, I, J, and K. In another embodiment, the herbal extract is derived from a plant of the genus *Asclepias*. Not wishing to be bound by any theory, it is believed that the extracts comprise steroidal compounds, such as pregnane glycosides and pregnane aglycone, having appetite suppressant effects.

In another particular embodiment, the weight management agent is an exogenous hormone having a weight management effect. Non-limiting examples of such hormones include CCK, peptide YY, ghrelin, bombesin and gastrin-releasing peptide (GRP), enterostatin, apolipoprotein A-IV, GLP-1, amylin, somastatin, and leptin.

In another embodiment, the weight management agent is a pharmaceutical drug. Non-limiting examples include phentenime, diethylpropion, phendimetrazine, sibutramine, rimonabant, oxyntomodulin, floxetine hydrochloride, ephedrine, phenethylamine, or other stimulants.

In certain embodiments, the functional ingredient is at least one osteoporosis management agent. In certain embodiments, the osteoporosis management agent is at least one calcium source. According to a particular embodiment, the calcium source is any compound containing calcium, including salt complexes, solubilized species, and other forms of calcium. Non-limiting examples of calcium sources include amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium citrate malate, calcium gluconate, calcium tartrate, calcium lactate, solubilized species thereof, and combinations thereof.

According to a particular embodiment, the osteoporosis management agent is a magnesium source. The magnesium source is any compound containing magnesium, including salt complexes, solubilized species, and other forms of magnesium. Non-limiting examples of magnesium sources include magnesium chloride, magnesium citrate, magnesium gluceptate, magnesium gluconate, magnesium lactate, magnesium hydroxide, magnesium picolate, magnesium sulfate, solubilized species thereof, and mixtures thereof. In another particular embodiment, the magnesium source comprises an amino acid chelated or creatine chelated magnesium.

In other embodiments, the osteoporosis agent is chosen from vitamins D, C, K, their precursors and/or beta-carotene and combinations thereof.

Numerous plants and plant extracts also have been identified as being effective in the prevention and treatment of osteoporosis. Non-limiting examples of suitable plants and plant extracts as osteoporosis management agents include species of the genus *Taraxacum* and *Amelanchier*, as disclosed in U.S. Patent Publication No. 2005/0106215, and species of the genus *Lindera, Artemisia, Acorus, Carthamus, Carum, Cnidium, Curcuma, Cyperus, Juniperus, Prunus, Iris, Cichorium, Dodonaea, Epimedium, Erigonoum, Soya, Mentha, Ocimum, Thymus, Tanacetum, Plantago, Spearmint, Bixa, Vitis, Rosemarinus, Rhus*, and *Anethum*, as disclosed in U.S. Patent Publication No. 2005/0079232.

In certain embodiments, the functional ingredient is at least one phytoestrogen. Phytoestrogens are compounds found in plants which can typically be delivered into human bodies by ingestion of the plants or the plant parts having the phytoestrogens. As used herein, "phytoestrogen" refers to any substance which, when introduced into a body causes an estrogen-like effect of any degree. For example, a phytoestrogen may bind to estrogen receptors within the body and have a small estrogen-like effect.

Examples of suitable phytoestrogens for embodiments of this invention include, but are not limited to, isoflavones, stilbenes, lignans, resorcyclic acid lactones, coumestans, coumestrol, equol, and combinations thereof. Sources of suitable phytoestrogens include, but are not limited to, whole grains, cereals, fibers, fruits, vegetables, black cohosh, agave root, black currant, black haw, chasteberries, cramp bark, dong quai root, devil's club root, false unicorn root, ginseng root, groundsel herb, licorice, liferoot herb, motherwort herb, peony root, raspberry leaves, rose family plants, sage leaves, sarsaparilla root, saw palmetto berried, wild yam root, yarrow blossoms, legumes, soybeans, soy products (e.g., miso, soy flour, soymilk, soy nuts, soy protein isolate, tempen, or tofu) chick peas, nuts, lentils, seeds, clover, red clover, dandelion leaves, dandelion roots, fenugreek seeds, green tea, hops, red wine, flaxseed, garlic, onions, linseed, borage, butterfly weed, caraway, chaste tree, vitex, dates, dill, fennel seed, gotu kola, milk thistle, pennyroyal, pomegranates, southernwood, soya flour, tansy, and root of the kudzu vine (pueraria root) and the like, and combinations thereof.

Isoflavones belong to the group of phytonutrients called polyphenols. In general, polyphenols (also known as "polyphenolics"), are a group of chemical substances found in plants, characterized by the presence of more than one phenol group per molecule.

Suitable phytoestrogen isoflavones in accordance with embodiments of this invention include genistein, daidzein, glycitein, biochanin A, formononetin, their respective naturally occurring glycosides and glycoside conjugates, matairesinol, secoisolariciresinol, enterolactone, enterodiol, textured vegetable protein, and combinations thereof.

Suitable sources of isoflavones for embodiments of this invention include, but are not limited to, soy beans, soy products, legumes, alfalfa sprouts, chickpeas, peanuts, and red clover.

In certain embodiments, the functional ingredient is at least one long chain primary aliphatic saturated alcohol. Long-chain primary aliphatic saturated alcohols are a diverse group of organic compounds. The term alcohol refers to the fact these compounds feature a hydroxyl group (—OH) bound to a carbon atom. Non-limiting examples of particular long-chain primary aliphatic saturated alcohols for use in particular embodiments of the invention include the 8 carbon atom 1-octanol, the 9 carbon 1-nonanol, the 10 carbon atom 1-decanol, the 12 carbon atom 1-dodecanol, the 14 carbon atom 1-tetradecanol, the 16 carbon atom 1-hexadecanol, the 18 carbon atom 1-octadecanol, the 20 carbon atom 1-eicosanol, the 22 carbon 1-docosanol, the 24 carbon 1-tetracosanol, the 26 carbon 1-hexacosanol, the 27 carbon 1-heptacosanol, the 28 carbon 1-octanosol, the 29 carbon 1-nonacosanol, the 30 carbon 1-triacontanol, the 32 carbon 1-dotriacontanol, and the 34 carbon 1-tetracontanol.

In one embodiment, the long-chain primary aliphatic saturated alcohol is a policosanol. Policosanol is the term for a mixture of long-chain primary aliphatic saturated alcohols composed primarily of 28 carbon 1-octanosol and 30 carbon 1-triacontanol, as well as other alcohols in lower concentrations such as 22 carbon 1-docosanol, 24 carbon 1-tetracosanol, 26 carbon 1-hexacosanol, 27 carbon 1-heptacosanol, 29 carbon 1-nonacosanol, 32 carbon 1-dotriacontanol, and 34 carbon 1-tetracontanol.

In certain embodiments, the functional ingredient is at least one phytosterol, phytostanol or combination thereof. As used herein, the phrases "stanol", "plant stanol" and "phytostanol" are synonymous. Plant sterols and stanols are present naturally in small quantities in many fruits, vegetables, nuts, seeds, cereals, legumes, vegetable oils, bark of the trees and other plant sources. Sterols are a subgroup of steroids with a hydroxyl group at C-3. Generally, phytosterols have a double bond within the steroid nucleus, like cholesterol; however, phytosterols also may comprise a substituted side chain (R) at C-24, such as an ethyl or methyl group, or an additional double bond. The structures of phytosterols are well known to those of skill in the art.

At least 44 naturally-occurring phytosterols have been discovered, and generally are derived from plants, such as corn, soy, wheat, and wood oils; however, they also may be produced synthetically to form compositions identical to those in nature or having properties similar to those of naturally-occurring phytosterols. Non-limiting suitable phytosterols include, but are not limited to, 4-desmethylsterols (e.g., β-sitosterol, campesterol, stigmasterol, brassicasterol, 22-dehydrobrassicasterol, and Δ5-avenasterol), 4-monomethyl sterols, and 4,4-dimethyl sterols (triterpene alcohols) (e.g., cycloartenol, 24-methylenecycloartanol, and cyclobranol).

As used herein, the phrases "stanol", "plant stanol" and "phytostanol" are synonymous. Phytostanols are saturated sterol alcohols present in only trace amounts in nature and also may be synthetically produced, such as by hydrogenation of phytosterols. Suitable phytostanols include, but are not limited to, β-sitostanol, campestanol, cycloartanol, and saturated forms of other triterpene alcohols.

Both phytosterols and phytostanols, as used herein, include the various isomers such as the α and β isomers. The phytosterols and phytostanols of the present invention also may be in their ester form. Suitable methods for deriving the esters of phytosterols and phytostanols are well known to those of ordinary skill in the art, and are disclosed in U.S. Pat. Nos. 6,589,588, 6,635,774, 6,800,317, and U.S. Patent Publication Number 2003/0045473. Non-limiting examples of suitable phytosterol and phytostanol esters include sitosterol acetate, sitosterol oleate, stigmasterol oleate, and their corresponding phytostanol esters. The phytosterols and phytostanols of the present invention also may include their derivatives.

Exemplary additives include, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, caffeine, flavorants and flavoring ingredients, astringent compounds, proteins or protein hydrolysates, surfactants, emulsifiers, plant extracts, flavonoids, alcohols, polymers and combinations thereof.

In one embodiment, the composition further comprises one or more polyols. The term "polyol", as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group. Non-limiting examples of polyols in some embodiments include maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect taste.

Suitable amino acid additives include, but are not limited to, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid (α-, β-, and/or δ-isomers), glutamine, hydroxyproline, taurine, norvaline, sarcosine, and their salt forms such as sodium or potassium salts or acid salts. The amino acid additives also may be in the D- or L-configuration and in the mono-, di-, or tri-form of the same or different amino acids. Additionally, the amino acids may be α-, β-, γ- and/or δ-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-α-lysine or poly-L-ε-lysine), poly-L-ornithine (e.g., poly-L-α-ornithine or poly-L-ε-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be α-, β-, γ-, δ-, and ε-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-α-lysine with a MW of 1,500, MW of 6,000, MW of 25,200, MW of 63,000, MW of 83,000, or MW of 300,000.

Suitable sugar acid additives include, but are not limited to, aldonic, uronic, aldaric, alginic, gluconic, glucuronic, glucaric, galactaric, galacturonic, and salts thereof (e.g., sodium, potassium, calcium, magnesium salts or other physiologically acceptable salts), and combinations thereof.

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, uracil).

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

Suitable organic acid additive salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), sorbic acid and adipic acid. The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato. In particular embodiments, the organic acid additive is present in the sweetener composition in an amount effective to provide a concentration from about 10 ppm to about 5,000 ppm when present in a consumable, such as, for example, a beverage.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

Suitable bitter compound additives include, but are not limited to, caffeine, quinine, urea, bitter orange oil, naringin, quassia, and salts thereof.

Suitable flavorants and flavoring ingredient additives include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring ingredient" are synonymous and can include natural or synthetic substances or combinations thereof. Flavorants also include any other substance which imparts flavor and may include natural or non-natural (synthetic) substances which are safe for human or animals when used in a generally accepted range. Non-limiting examples of proprietary flavorants include Döhler™ Natural Flavoring Sweetness Enhancer K14323 (Döhler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10

(Natural Advantage™, Freehold, New Jersey, U.S.A.), and Sucramask™ (Creative Research Management, Stockton, California, U.S.A.).

Suitable polymer additives include, but are not limited to, chitosan, pectin, pectic, pectinic, polyuronic, polygalacturonic acid, starch, food hydrocolloid or crude extracts thereof (e.g., gum acacia senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

Suitable protein or protein hydrolysate additives include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

Suitable surfactant additives include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

Suitable flavonoid additives are classified as flavonols, flavones, flavanones, flavan-3-ols, isoflavones, or anthocyanidins. Non-limiting examples of flavonoid additives include, but are not limited to, catechins (e.g., green tea extracts such as Polyphenon™ 60, Polyphenon™ 30, and Polyphenon™ 25 (Mitsui Norin Co., Ltd., Japan), polyphenols, rutins (e.g., enzyme modified rutin Sanmelin™ AO (San-fi Gen F.F.I., Inc., Osaka, Japan)), neohesperidin, naringin, neohesperidin dihydrochalcone, and the like.

Suitable alcohol additives include, but are not limited to, ethanol.

Suitable astringent compound additives include, but are not limited to, tannic acid, europium chloride ($EuCl_3$), gadolinium chloride ($GdCl_3$), terbium chloride ($TbCl_3$), alum, tannic acid, and polyphenols (e.g., tea polyphenols).

III. Methods

The present invention also provides a method of preparing a ready-to-drink beverage comprising (i) providing a beverage matrix and (ii) adding the beverage ingredients described hereinabove to the beverage matrix, thereby providing a ready-to-drink beverage. The method optionally includes a further mixing step whereby the beverage ingredients and matrix are mixed to promote dissolution. The method can also optionally include a heating step, whereby the beverage ingredients and matrix are heated to promote dissolution.

Beverage ingredients are dissolved in the beverage matrix. Exemplary beverage matrices include water of beverage quality, for example deionized water, distilled water, reverse osmosis water, carbon-treated water, purified water, demineralized water and combinations thereof. Additional suitable matrices include, but are not limited to phosphoric acid, phosphate buffer, citric acid, citrate buffer and carbon-treated water.

The method can be performed at any temperature required to formulate the ready-to-drink beverage. For example, for ingredients that are temperature sensitive, the method is carried out below 70 °C. Similarly, the beverage ingredients can be added to the beverage matrix in any order.

EXAMPLES

Example 1: Preparation of Ready-to-Drink Beverages

The following two ready-to-drink beverage formulations were prepared by mixing all ingredients until they dissolved completely. The beverage was then mixed for a further 15 minutes. The beverage was then heat treated at 195+/−2 °F for 21-23 seconds, filled at 180 °F to 185 °F and cooled rapidly to room temperature.

Sports Beverage Formulation 1

| Ingredient | Amount in Beverage (ppm-mg/L) | |
|---|---|---|
| Creatine Monohydrate | 2100 | Contributes~600 mg/L creatine |
| Branched Chain Amino Acids | 2224 | |
| Citric Acid | 1599 | |
| Sodium Chloride | 1065 | Contributes 630 mg/L Sodium |
| Tri-sodium Citrate | 785 | |
| Natural Flavor | 1582 | |
| Potassium Phosphate | 541 | Contributes 160 mg/L Potassium |
| Sucralose | 323 | |
| Ascorbic Acid | 50 | |
| Magnesium Chloride | 42.4 | Contributes 5 mg/L Magnesium |
| Calcium Chloride | 38.7 | Contributes 10 mg/L Calcium |
| Asulfame Potassium | 32.3 | |
| Niacin | 15.1 | |
| Vitamin B6 | 1.88 | |
| Vitamin B12 | 9.90 micro grams | |
| Calcium Disodium | 24 EDTA | |

Sports Beverage Formulation 2

| Ingredient | Amount in Beverage (ppm-mg/L) | |
|---|---|---|
| Creatine Monohydrate | 2100 | Contributes~800 mg/L creatine |
| Branched Chain Amino Acids | 2224 | |
| Citric Acid | 1599 | |
| Sodium Chloride | 1048 | Contributes 420 mg/L Sodium |
| Natural Flavor | 1582 | |
| Potassium Phosphate | 361 | |
| Sucralose | 323 | Contributes 100 mg/L Potassium |

-continued

| Ingredient | Amount in Beverage (ppm-mg/L) | |
|---|---|---|
| Ascorbic Acid | 50 | |
| Magnesium Chloride | 42.4 | |
| Calcium Chloride | 38.7 | Contributes 5 mg/L Magnesium |
| Asulfame Potassium | 32.3 | Contributes 10 mg/L Calcium |
| Niacin | 15.1 | |
| Vitamin B6 | 1.88 | |
| Vitamin B12 | 9.90 micro grams | |
| Calcium Disodium EDTA | 24 | |

Example 2: Stability Study of Ready-to-Drink Beverages

The stability of the two ready-to-drink beverages described Example 1 was studied. The beverages were allowed to stand at 5 °C or 21 °C for the period of time indicated. Creatine was measured by HPLC with UV detection according to the method provided in Analytical Biochemistry 2014, pp. 278-283 (1993). Briefly, reversed-phase chromatography on a C18 column by employing gradient elution and UV detection at 210 nm was utilized. Separation was achieved in less than 5 minutes. The results are provided in Tables 1 and 2, below:

TABLE 1

| | Creatine Monohydrate (mg/L) | | | |
|---|---|---|---|---|
| | Sports Beverage Formulation #1 | | Sports Beverage Formulation #2 | |
| Time (weeks) | 5 °C | 21 °C | 5 °C | 21 °C |
| 0 | 1606 | | 1772 | |
| 4 | 1625 | 952 | 1739 | 1022 |
| 9 | 1598 | 942 | 1728 | 1018 |
| 13 | 1490 | 922 | 1666 | 997 |
| 26 | 1276 | 866 | 1354 | 942 |

TABLE 2

| | Creatine Monohydrate (% retention) | | | |
|---|---|---|---|---|
| | Sports Beverage Formulation #1 | | Sports Beverage Formulation #1 | |
| Time (weeks) | 5 °C | 21 °C | 5 °C | 21 °C |
| 0 | 100% | | 100% | |
| 4 | 101% | 59% | 98% | 58% |
| 9 | 100% | 59% | 98% | 57% |
| 13 | 93% | 57% | 94% | 56% |
| 26 | 79% | 54% | 76% | 53% |

The invention claimed is:

1. A ready-to-drink beverage comprising:

(i) about 500 mg/L to about 5000 mg/L of at least one creatine compound selected from the group consisting of creatine monohydrate, creatine nitrate, phosphocreatine, creatine methyl ester, creatine ethyl ester, creatine ethyl ester malate, creatine malate, creatine gluconate, tricreatine malate, tricreatine orotate, creatine citrate, creatine pyruvate, creatine alphaketoglutarate and combinations thereof;

(ii) about 1000 mg/L to about 5000 mg/L of at least one branched-chain amino acid selected from the group consisting of leucine, isoleucine, valine and combinations thereof;

(iii) about 5 mg/L to about 20 mg/L magnesium;

(iv) about 300 mg/L to about 800 mg/L sodium;

(v) about 50 mg/L to about 300 mg/L potassium;

wherein (i)-(v) are dissolved in a beverage matrix comprising water;

wherein the pH of the beverage is about 1 to about 6; and the creatine concentration of the beverage after three months of storage at 5 °C is at least 90% of the initial creatine concentration and/or the creatine concentration of the beverage after three months of storage at ambient temperature is at least 40% of the initial creatine concentration.

2. The ready-to-drink beverage of claim 1, wherein the beverage is selected from a sports drink and an enhanced water drink.

3. The ready-to-drink beverage of claim 1, wherein the creatine compound is selected from the group consisting of creatine monohydrate.

4. The ready-to-drink beverage of claim 1, wherein the concentration of creatine is from about 1000 mg/L to about 5,000 mg/L.

5. The ready-to-drink beverage of claim 1, wherein the beverage comprises leucine, isoleucine, and valine.

6. The ready-to-drink beverage of claim 5, wherein the concentration of at least one branched-chain amino acid is from about 2000 mg/L to about 3000 mg/L.

7. The ready-to-drink beverage of claim 1, further comprising at least one sweetener.

8. The ready-to-drink beverage of claim 1, further comprising at least one additive.

9. The ready-to-drink beverage of claim 1, further comprising at least one functional ingredient.

10. The ready-to-drink beverage of claim 1, wherein the ready-to-drink beverage is selected from a full-calorie beverage, a mid-calorie beverage, a low-calorie beverage and a zero-calorie beverage.

11. The ready-to-drink beverage of claim 1, wherein the ready-to-drink beverage having less than about 5 calories per 8 ounce serving.

12. The ready-to-drink beverage of claim 1, wherein the beverage comprises potassium acesulfame and sucralose.

13. The ready-to-drink beverage of claim 1, wherein the beverage comprises at least one antioxidant.

14. The ready-to-drink beverage of claim 1, wherein the beverage comprises at least one vitamin.

15. The ready-to-drink beverage of claim 1, wherein the beverage comprises sucralose.

16. The ready-to-drink beverage of claim 1, wherein the beverage comprises about 1 mg/L to about 50 mg/L calcium.

* * * * *